United States Patent
Wenk

(10) Patent No.: US 8,300,384 B2
(45) Date of Patent: Oct. 30, 2012

(54) AIR VARIABLE CAPACITOR COMPRISING AN INTERDIGITAL MOBILE COMB AND FIXED COMB, ACCELEROMETER AND GYROMETER COMPRISING SUCH A CAPACITOR

(75) Inventor: Béatrice Wenk, Grenoble (FR)

(73) Assignee: MEMSCAP, Crolles (FR)

( * ) Notice: Subject to any disclaimer, the term of this patent is extended or adjusted under 35 U.S.C. 154(b) by 585 days.

(21) Appl. No.: 12/329,695

(22) Filed: Dec. 8, 2008

(65) Prior Publication Data
US 2009/0147436 A1      Jun. 11, 2009

(30) Foreign Application Priority Data

Dec. 11, 2007  (FR) ..................................... 07 59751

(51) Int. Cl.
*H01G 5/011* (2006.01)
*H01G 5/16* (2006.01)
(52) U.S. Cl. ......... 361/290; 361/277; 361/278; 361/287
(58) Field of Classification Search .......... 361/277–300
See application file for complete search history.

(56) References Cited

U.S. PATENT DOCUMENTS

| 5,025,346 | A | | 6/1991 | Tang et al. |
| 5,959,516 | A | * | 9/1999 | Chang et al. .................... 334/14 |
| 6,257,061 | B1 | * | 7/2001 | Nonoyama et al. ........ 73/514.32 |
| 6,301,965 | B1 | * | 10/2001 | Chu et al. ................... 73/514.18 |
| 6,316,796 | B1 | * | 11/2001 | Petersen et al. ............... 257/254 |
| 6,384,952 | B1 | * | 5/2002 | Clark et al. ................ 359/224.1 |
| 6,497,149 | B1 | * | 12/2002 | Moreau et al. ............. 73/514.32 |
| 6,508,126 | B2 | * | 1/2003 | Sakai et al. ................ 73/514.32 |
| 6,541,831 | B2 | * | 4/2003 | Lee et al. ....................... 257/415 |
| 6,543,285 | B2 | * | 4/2003 | Hashimoto ................ 73/504.14 |
| 6,686,639 | B1 | * | 2/2004 | Tsai ............................... 257/415 |
| 6,914,711 | B2 | * | 7/2005 | Novotny et al. .............. 359/291 |
| 7,075,701 | B2 | * | 7/2006 | Novotny et al. .............. 359/291 |
| 7,552,638 | B2 | * | 6/2009 | Menard et al. ............. 73/514.18 |
| 7,562,573 | B2 | * | 7/2009 | Yazdi ......................... 73/514.32 |
| 7,797,998 | B2 | * | 9/2010 | Menard et al. ............. 73/514.18 |
| 7,808,766 | B2 | * | 10/2010 | Despesse et al. ............. 361/278 |
| 2002/0005976 | A1 | * | 1/2002 | Behin et al. ................... 359/254 |

(Continued)

FOREIGN PATENT DOCUMENTS

FR         2700012         7/1994

(Continued)

OTHER PUBLICATIONS

Wenjing Ye, Subrata Mukherjee, and Noel C. MacDonald, *Fellow, IEEE, Optimal Shape Design of an Electrostatic Comb Drive in Microelectromechanical Systems,* Journal of Microelectromechanical Systems, vol. 7, No. 1, Mar. 1998 (11 pgs.).

(Continued)

*Primary Examiner* — Anatoly Vortman

(57) ABSTRACT

The invention relates to an air variable capacitor including a mobile comb and a fixed comb. Each of the combs include a body and teeth each having an end fixed to the body and free end. The teeth of the mobile and fixed combs being interdigital and an the air-gap of the capacitor is adjustable by the transverse movement of the teeth of the mobile comb. The teeth of the mobile comb have geometric differences between one another, in order to attenuate the transverse resonance modes of the mobile comb.

11 Claims, 4 Drawing Sheets

U.S. PATENT DOCUMENTS

| | | | |
|---|---|---|---|
| 2003/0006861 A1* | 1/2003 | Taussig | 333/186 |
| 2003/0218793 A1* | 11/2003 | Soneda et al. | 359/291 |
| 2004/0041670 A1* | 3/2004 | Murata | 333/262 |
| 2006/0077531 A1* | 4/2006 | Novotny et al. | 359/291 |
| 2008/0196500 A1* | 8/2008 | Menard et al. | 73/514.18 |
| 2008/0218933 A1* | 9/2008 | Mi et al. | 361/278 |
| 2010/0038753 A1* | 2/2010 | Ni | 257/532 |

FOREIGN PATENT DOCUMENTS

| | | |
|---|---|---|
| FR | 2858853 | 2/2005 |
| FR | 2858854 | 2/2005 |
| FR | 2888394 | 1/2007 |

OTHER PUBLICATIONS

Brian D. Jensen, *Student Member, ASME*, Senol Mutlu, Sam Miller, Katsuo Kurabayashi, *Member, IEEE, ASME*, and James J. Allen, *Member, ASME, Shaped Comb Fingers for Tailored Electromechanical Restoring Force, Journal of Microelectromechanical Systems*, vol. 12, No. 3, Jun. 2003 (11 pgs.).

D. Scheiber, J. Mehner, D. Reuter, T. Gessner, W. Dotzel, *A spectral vibration detection system based on tunable micromechanical resonators*, www.sciencedirect.com (10 pgs.), Apr. 2005.

Republic of France International Search Resort dated Aug. 8, 2008 (3 pgs.).

* cited by examiner

AIR VARIABLE CAPACITOR COMPRISING AN INTERDIGITAL MOBILE COMB AND FIXED COMB, ACCELEROMETER AND GYROMETER COMPRISING SUCH A CAPACITOR

CROSS REFERENCE TO RELATED APPLICATIONS

This application claims priority under 35 U.S.C. 119 from French Patent Application No. 0759751 filed on Dec. 11, 2007 in the French Patent Office, the entire disclosure of which is incorporated herein by reference.

FIELD OF THE INVENTION

The present invention relates to the field of variable capacitors comprising two combs with interdigital teeth, and more particularly to the field of capacitors wherein the air-gap varies under the effect of a movement of the teeth of the mobile comb in a direction perpendicular to the main axis of said teeth.

The invention has an application particularly in miniaturized accelerometers and gyrometers.

BACKGROUND OF THE INVENTION

A capacitor with a variable capacitance, used in a miniaturized accelerometer or a gyrometer, comprises a mobile comb and a fixed comb. The teeth of these combs are interdigital and together form a capacitance whereof the air-gap varies according to the movement of the mobile comb in a direction perpendicular to the main axis, or "longitudinal" axis, of the teeth, and whereof the opposite surfaces have a constant area. A measurement and control device is moreover connected to the mobile and fixed combs to measure the capacitance that they form together and, by means of a feedback loop, to control the position of the mobile comb at a central position.

It is commonly observed that each of the teeth of the mobile comb has a natural vibration mode and is capable of resonating with the neighboring teeth when the teeth of the mobile comb are subject to a movement in a direction perpendicular to their axis (referred to as the transverse direction). When the teeth of the mobile comb vibrate together (referred to as "transverse resonance mode" of the mobile comb), the capacitor often becomes unusable due to the noise generated by this vibration. Moreover, the position control of the mobile comb may become unstable, and the teeth are weakened due to the high bending forces that they undergo.

To overcome such drawbacks, documents FR-A-2 858 853 and FR-A-2 858 854 disclose combs of which the teeth, all identical, have a cross section of variable width along their longitudinal axis, and a particular choice of a closed loop for position control. The transverse resonance mode of the mobile comb is thus positioned in a zone characterized by a substantially zero gain of the closed loop. Through an appropriate choice thereof, this zone is furthermore located outside the range of useful frequencies of the capacitor, so that the entry of the teeth of the mobile comb into resonance does not significantly disturb the measurement of the capacitance formed by the combs.

However, since the teeth of the mobile comb are always identical, the transverse resonance mode of the mobile comb is not eliminated as such. The teeth of the mobile comb are therefore still subject to high bending forces that may weaken them. Moreover, the geometry proposed by the documents mentioned above gives rise to larger teeth and consequently a lower grade capacitor.

SUMMARY OF THE INVENTION

It is the object of the present invention to solve the above-mentioned problem by proposing a capacitor with a variable capacitance of which the transverse resonance mode of the mobile comb is attenuated, thereby avoiding the noise, the position control instability and the weakening of the teeth.

For this purpose, the invention relates to a capacitor with variable air-gap, comprising a mobile comb and a fixed comb, each of the combs comprising a body, teeth having ends fixed to the body and free ends, the teeth of the mobile and fixed combs being interdigital, the air-gap of said capacitor being adjustable by the transverse movement of the teeth of the mobile comb.

According to the invention, the teeth of the mobile comb have geometric differences between one another, in order to attenuate the transverse resonance modes of the mobile comb.

In other words, this involves an energy uncoupling of the teeth of the mobile comb. In fact, the teeth vibrate together owing to the equality of their self-resonant frequencies. Accordingly, when the teeth have geometric differences between one another, their natural frequencies are no longer identical and the resonance mode of the comb is thereby attenuated.

Furthermore, it is observed that it is unnecessary to modify the position control to take account of the geometric differences of the mobile comb. The control laws of the prior art can thus be used with a capacitor of the invention.

According to particular embodiments of the invention, the capacitor comprises one or more of the following features.

The teeth of the comb have differences in length, width and/or shape between one another.

In other words, the energy uncoupling of the teeth is provided by the in-plane geometric differences of the comb. The fabrication of the comb, by chemical attack for example, is thereby facilitated by the use of an appropriate mask.

A natural resonance frequency of a tooth of the mobile comb differs from those of the neighboring teeth by at least one percent.

In other words, the inventors have observed that a difference of one percent between the self-resonant frequencies of neighboring teeth of the mobile comb has the effect of substantially canceling the resonance mode thereof.

The layout of the teeth of the mobile comb has blocks of substantially identical teeth. In particular, the free ends of the teeth of the mobile comb form a linear layout in pieces such as a herringbone layout or a V layout for example.

In other words, it is unnecessary for all the teeth to be different. Groups of identical teeth can thus be considered while ensuring an attenuation or an effective cancellation of the resonance mode of the mobile comb. The fabrication of the capacitor is thereby facilitated and the mobile comb is more compact.

The free ends of the teeth of the mobile comb form a pseudo-random layout.

In other words, by selecting a pseudo-random pattern, it is guaranteed with a very high probability that all the teeth of the mobile comb are different so as to cancel the resonance mode thereof. In fact, with groups of identical teeth, an energy coupling may subsist between distant teeth. The resonance mode, albeit attenuated may therefore still exist, even though, in practice it is observed that such a coupling is too weak to generate a noise that is detrimental to the target applications.

The teeth of the fixed comb are substantially identical to the teeth of the mobile comb.

Thus, by selecting a fixed comb substantially identical to the mobile comb, the capacitor is more compact.

The invention also relates to an accelerometer and a gyrometer comprising a capacitor of the abovementioned type.

BRIEF DESCRIPTION OF THE DRAWINGS

The invention will be better understood from a reading of the description that follows, provided exclusively as an example, and in conjunction with the appended drawings, in which identical referenced numerals denote identical or similar elements, and in which.

DETAILED DESCRIPTION OF THE INVENTION

Figure 1:
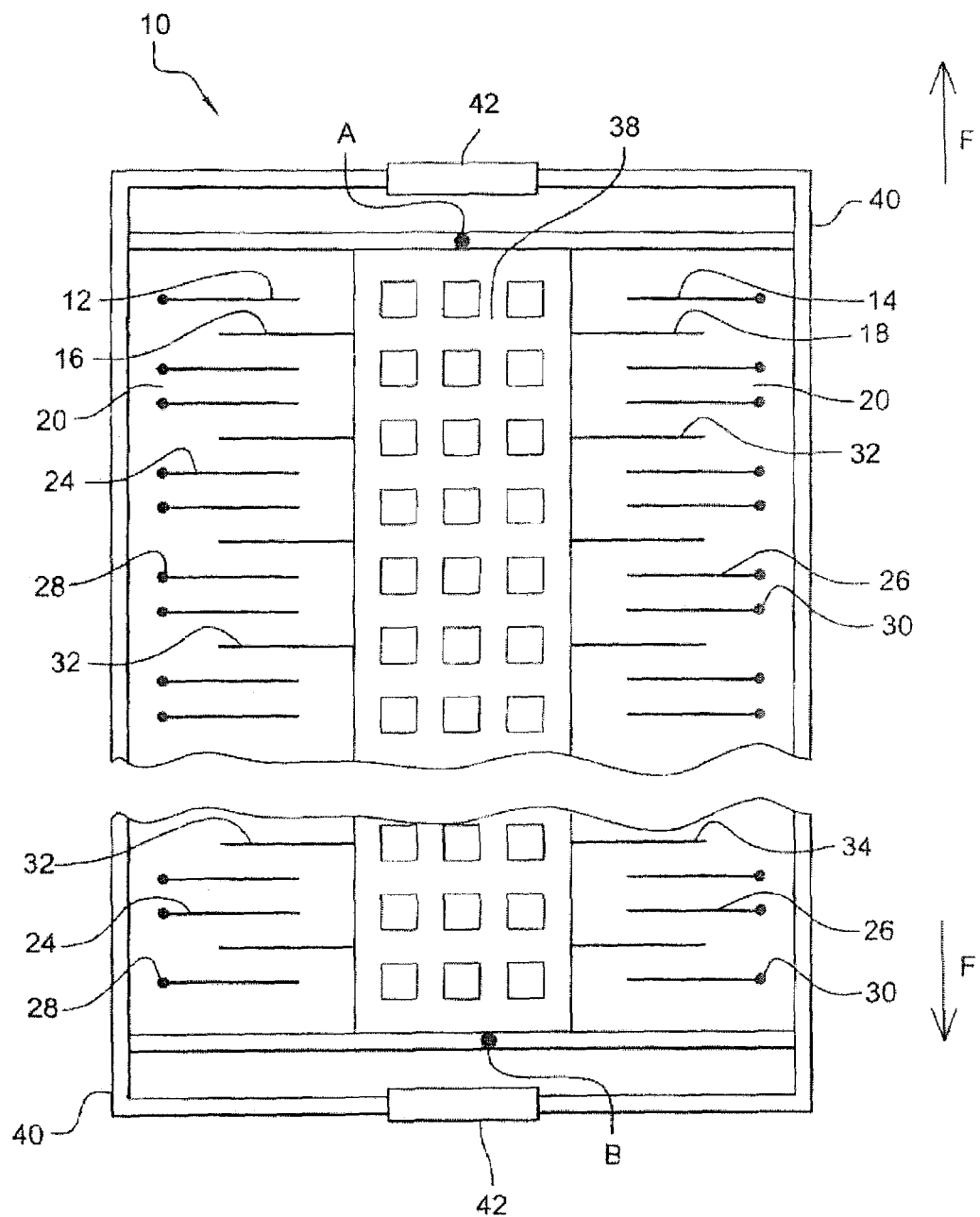
FIG. 1 is a schematic view of a first capacitor of the prior art.

FIG. 1 shows, under the general reference numeral 10, a capacitor of the prior art with a variable air-gap and whereof the opposite surfaces have a constant area, as described in document FR-A-2 700 012.

The capacitor 10, used here in an accelerometer, comprises two fixed combs 12, 14, and two mobile combs 16, 18, a mobile comb being interdigital with a fixed comb.

The fixed combs 12, 14 comprise a single body 20, for example formed from a silicon substrate layer, and teeth 24, 26 of which the ends are fixed to the body 20 by means of anchoring points 28, 30.

Each mobile comb 16, 18 comprises teeth 32, 34 of which the ends are fixed to a single mobile mass 38. The mobile mass 38 is fixed to a deformable frame 40, which is itself fixed to the body 22 by anchoring points 42. The portions of frame 40 parallel to the teeth also provide a spring function.

Under the effect of an acceleration in the direction of the arrows F, that is, in a direction substantially perpendicular to the axis of the teeth 32, 34, or "transverse" movement, the mobile mass 38 is actuated to move in this direction. The spacing between the teeth of the mobile combs and the teeth of the fixed combs, and hence the air-gap and in consequence the capacitance formed between the interdigital mobile and fixed combs, thus varies according to the acceleration undergone. It may be observed that the opposite surfaces of the teeth 32, 34 of the mobile comb remain identical during the transverse movement thereof.

For further details on the layout and operation of this accelerometer, reference can be made to the abovementioned document.

Figure 2:
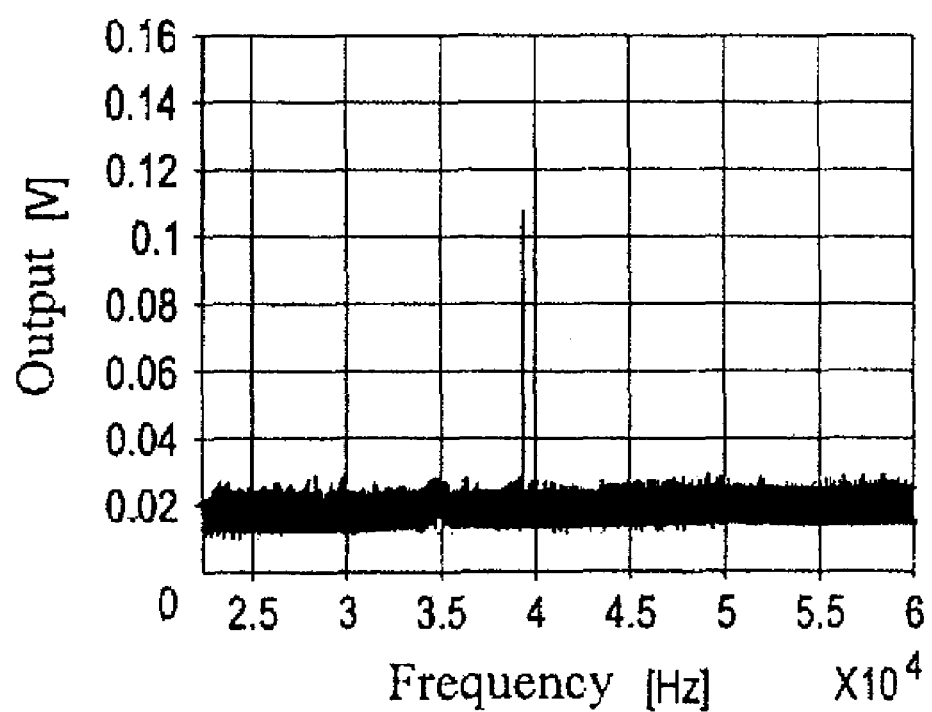
FIG. 2 is a plot illustrating a resonance mode of the capacitor in FIG. 1.

In the example of the prior art illustrated here, the teeth 32, 34 of the mobile combs 16, 18 are substantially identical. A transverse resonance mode of each mobile comb 16, 18 is thus observed. For example, in the case of a mobile comb formed of teeth having a length of 500 microns, a transverse resonance mode is present at above 40 kHz, as illustrated in FIG. 2. To measure such a transverse resonance mode, a sinusoidal voltage is applied to the ends of the mobile comb, for example at terminals A and B of the mobile mass 38, by varying the frequency thereof by a predefined step.

Figure 3:
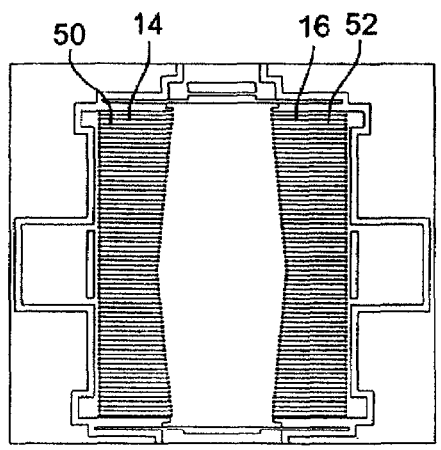
FIG. 3 is a first embodiment of a capacitor according to the invention.
Figure 4:
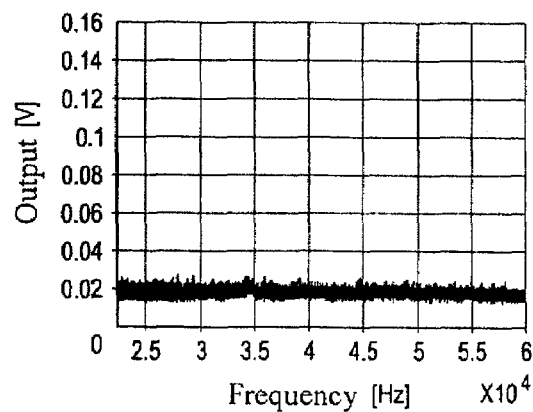
FIG. 4 is a plot illustrating the absence of a resonance mode of the capacitor in FIG. 3.

FIG. 3 shows a first embodiment of a capacitor according to the invention. This embodiment is identical to the one in FIG. 1, with the sole difference that the length of the teeth 50, 52 of the mobile combs 16, 18 differ from one next to the other. More particularly, the free ends of the teeth 50, 52 of each mobile comb 16, 18 form a V layout, the length of a tooth varying by at least 3 microns from the length of the neighboring teeth. As shown in FIG. 4, the transverse resonance mode of the mobile comb 14, 16 has substantially disappeared.

Figure 5:
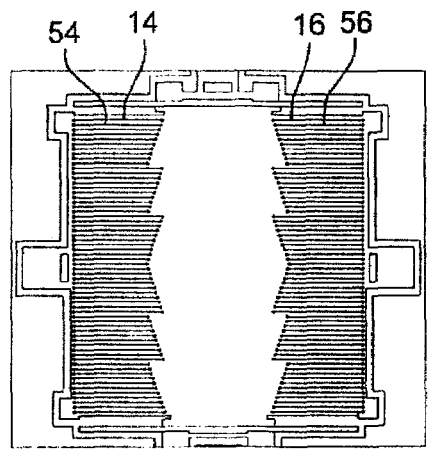
FIG. 5 is a second embodiment of a capacitor according to the invention.
Figure 6:
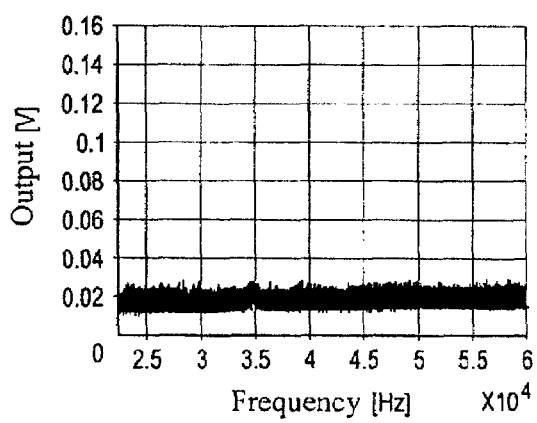
FIG. 6 is a plot illustrating the absence of a resonance mode of the capacitor in FIG. 5.

FIG. 5 shows a second embodiment in which the free ends of the teeth 54, 56 of each mobile comb 14, 16 form a herringbone layout, the length of one tooth varying by at least 3 microns from the length of the neighboring teeth. Here also, as shown in FIG. 6, the transverse resonance mode of the mobile comb 14, 16 has substantially disappeared.

Figure 7:
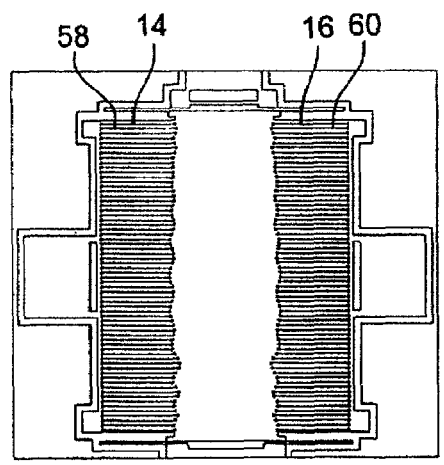
FIG. 7 is a third embodiment of a capacitor according to the invention.
Figure 8:
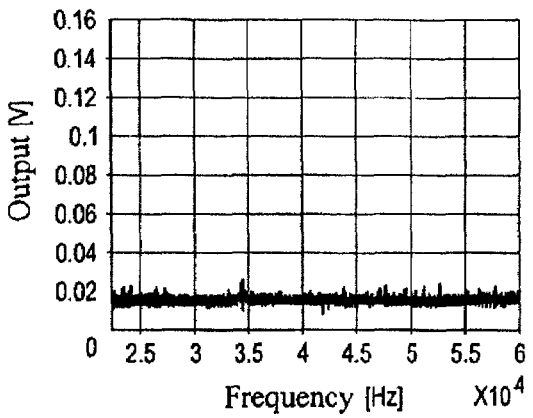
FIG. 8 is a plot illustrating the absence of a resonance mode of the capacitor in FIG. 7.

FIG. 7 shows a third embodiment in which the length of the teeth 58, 60 of each mobile comb 14, 16 varies pseudo-randomly in the range from 449 microns to 551 microns, with a difference of at least 3 microns between two neighboring teeth. Here also, as shown in FIG. 8, the transverse resonance mode of the mobile comb 14 and 16 has substantially disappeared.

In general, the inventors have observed that a geometric difference, like a difference in length, width or shape, between the neighboring teeth of a mobile comb, corresponding to a difference of at least 1 percent of their natural vibration frequency, substantially cancels the transverse resonance mode of the mobile comb.

It is obviously understandable that a wide range of possible embodiments of the invention exists. According to the technological limitations of fabrication for example, one or another of the geometric differences may be preferred. To design a comb according to the invention, a trial and error approach may be applied. For example, a mobile comb having geometric differences among its teeth is designed. Then, to determine whether the geometric differences between the teeth of this comb are sufficient to cancel or attenuate the transverse resonance mode, an A.C. voltage is for example applied to the terminals of the comb with a variable frequency. If the transverse resonance mode is still present, it will thus be excited. It then remains to modify the design of the mobile comb, for example by accentuating the amplitude of the geometric differences between its teeth.

The inventors have also observed that it is unnecessary for the teeth of a mobile comb to be all different from one another. Thus for example, as shown in FIGS. 3 and 5, the mobile comb may have blocks of identical teeth while attenuating or substantially canceling the transverse resonance mode. Providing blocks of identical teeth thereby facilitates the fabrication of the comb.

Figure 9:
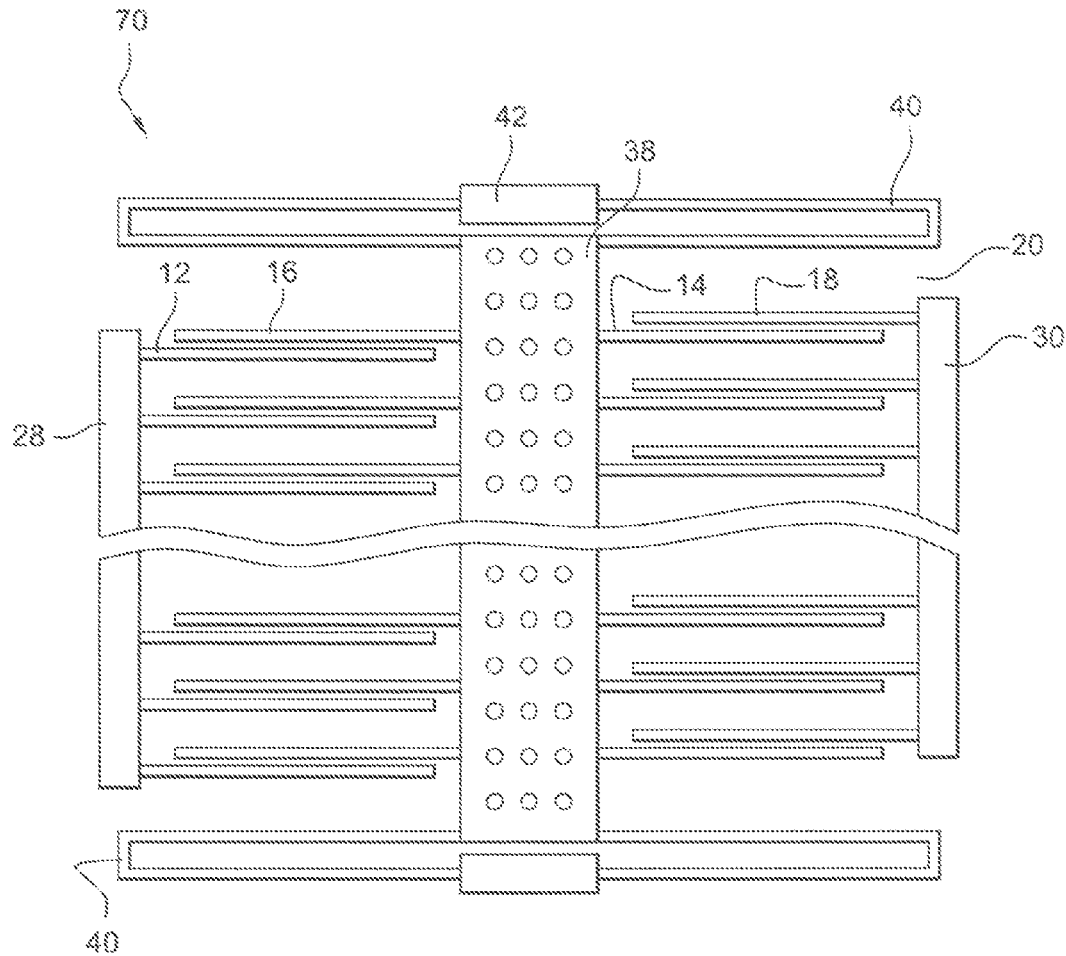
FIG. 9 is a schematic view of a second capacitor of the prior art to which the invention applies.

It is also understandable that the invention applies to any type of air variable capacitor of which the opposite surfaces have a constant area, comprising at least one interdigital mobile comb and one fixed comb. For example, the invention applies to a capacitor 70 as shown in FIG. 9, in which the mobile and fixed combs comprise the same number of teeth.

The invention also has an application in the field of accelerometers and gyrometers.

I claim:

1. A capacitor with variable air-gap, the capacitor comprising:
   a mobile comb and a fixed comb,
   each of the combs comprising a body and a plurality of teeth,
   each of the teeth of the mobile comb having an axis parallel to adjacent teeth of the mobile comb,
   each of the teeth of the mobile comb having an end fixed to the body of the mobile comb and a free end,
   the teeth of the mobile and fixed combs being interdigital,
   an air-gap of said capacitor varies according to a movement of the mobile comb perpendicular to the axis of the teeth of the mobile comb,
   wherein the teeth of the mobile comb have geometric differences between one another, in order to attenuate transverse resonance modes of the mobile comb.

2. The capacitor as claimed in claim 1, wherein the teeth of the mobile comb have differences in length, width and/or shape between one another.

3. The capacitor as claimed in claim 2, wherein a natural resonance frequency of each tooth of the mobile comb differs from those of neighboring teeth of the mobile comb by at least one percent.

4. The capacitor as claimed in claim 1, wherein the layout of the teeth of the mobile comb has blocks of substantially identical teeth.

5. The capacitor as claimed in claim 2, wherein the free ends of the teeth of the mobile comb form a linear layout in pieces.

6. The capacitor as claimed in claim 5, wherein the free ends of the teeth of the mobile comb form a herringbone layout.

7. The capacitor as claimed in claim 5, wherein the free ends of the teeth of the mobile comb form a V layout.

8. The capacitor as claimed in claim 2, wherein the free ends of the teeth of the mobile comb form a pseudo-random layout.

9. The capacitor as claimed in claim 2, wherein the teeth of the fixed comb are substantially identical to the teeth of the mobile comb.

10. An accelerometer comprising a capacitor as claimed in claim 2.

11. A gyrometer comprising a capacitor as claimed in claim 2.

* * * * *